United States Patent
Opshaug

(10) Patent No.: US 10,412,950 B2
(45) Date of Patent: *Sep. 17, 2019

(54) APPARATUS, METHOD, AND SYSTEM FOR MARINE LIFE TRAP

(71) Applicant: Blue Ocean Gear LLC, Redwood City, CA (US)

(72) Inventor: Kortney Noell Opshaug, Redwood City, CA (US)

(73) Assignee: Blue Ocean Gear LLC, Redwood City, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/727,908

(22) Filed: Oct. 9, 2017

(65) Prior Publication Data

US 2018/0027792 A1 Feb. 1, 2018

Related U.S. Application Data

(63) Continuation of application No. 15/135,109, filed on Apr. 21, 2016, now Pat. No. 9,814,226.

(60) Provisional application No. 62/251,341, filed on Nov. 5, 2015, provisional application No. 62/152,036, filed on Apr. 24, 2015.

(51) Int. Cl.
  *G08B 23/00* (2006.01)
  *A01K 97/12* (2006.01)
  *A01K 79/00* (2006.01)
  *A01K 69/08* (2006.01)

(52) U.S. Cl.
  CPC ............ *A01K 97/125* (2013.01); *A01K 69/08* (2013.01); *A01K 79/00* (2013.01)

(58) Field of Classification Search
  CPC ........ A01K 97/125; A01K 69/08; A01K 79/00
  USPC ............. 340/573.1, 539.1, 537, 870.02, 984; 367/99, 131; 701/21, 425
  See application file for complete search history.

(56) References Cited

U.S. PATENT DOCUMENTS

| | | | |
|---|---|---|---|
| 5,207,017 A * | 5/1993 | Litrico | A01K 69/06 43/100 |
| 5,782,033 A | 7/1998 | Park et al. | |
| 6,341,582 B1 * | 1/2002 | Gompper | A01K 1/0023 119/518 |
| 6,809,658 B1 * | 10/2004 | Lofaso | G08B 5/36 206/315.11 |
| 8,553,501 B1 | 10/2013 | Cota | |
| 8,651,057 B1 | 2/2014 | Welsh | |
| 8,775,070 B1 | 7/2014 | Bhatia | |
| 8,919,034 B2 | 12/2014 | Alhuwaishel | |
| 9,091,550 B1 | 7/2015 | Smith | |
| 2003/0061978 A1 | 4/2003 | Myers, Jr. | |

(Continued)

OTHER PUBLICATIONS

Speciality Products for Fish and Shellfish Pots and Traps. Neptune Marine Products. Web. Apr. 21, 2016.

*Primary Examiner* — Dhaval V Patel
(74) *Attorney, Agent, or Firm* — Lempia Summerfield Katz LLC

(57) ABSTRACT

Apparatuses, methods, and systems are provided for making the harvesting of sea life efficient. For example, real-time or periodic information about the status of the many traps a fisherman may have set is communicated to the fisherman while the traps are still in the water. A fisherman can use this information to determine the best time and path for trap retrieval and reset operations to reduce fuel use and improve the catch efficiency per unit effort.

23 Claims, 16 Drawing Sheets

(56) References Cited

U.S. PATENT DOCUMENTS

| | | |
|---|---|---|
| 2008/0016749 A1 | 1/2008 | Priednieks |
| 2013/0109259 A1 | 5/2013 | Abulrassoul et al. |
| 2013/0167428 A1 | 7/2013 | Alhuwaishel |
| 2015/0156998 A1 | 6/2015 | Terry |

* cited by examiner

APPARATUS, METHOD, AND SYSTEM FOR MARINE LIFE TRAP

RELATED APPLICATIONS

The present patent document is a continuation of U.S. patent application Ser. No. 15/135,109, filed Apr. 21, 2016, which claims the benefit of the filing dates under 35 U.S.C. § 119(e) of Provisional U.S. Patent Application Ser. Nos. 62/251,341, filed Nov. 5, 2015 and 62/152,036, filed Apr. 24, 2015, which are hereby incorporated by reference.

FIELD

The present invention generally relates to the field of modern fishing and trapping techniques.

BACKGROUND

Sea life harvesting such as crab and lobster fishing involves, among other things, fisherman setting traps at various locations spread out over many miles, then retrieving their harvest on a periodic basis. For example, lobster trappers may retrieve and reset their traps every two to four days. The fisherman must estimate the best periodicity with which to retrieve their traps. With experience, fisherman may retrieve a bountiful harvest. In certain situations, however, the fishermen may discover that their voyage to retrieve their traps was not fruitful such that it may have been better to wait a few more days. In certain other situations, the traps can get full quickly, but if a fisherman waits too long to check his traps, the catch may escape the traps after the bait is depleted. In this situation, a trap check that is too late may also yield a small harvest.

Typically, fishermen rebait and reset their traps in either the same location, or a new location based on estimated movement of the intended species. In some situations, the fisherman might have seen increased catch if the traps were relocated to better-performing areas. A fisherman may end up going back to the same location twice to relocate underperforming traps to a better performing location that was traveled to and harvested first.

Small harvests are not efficient especially in view of the high cost of fuel. A lobster boat may use thousands (e.g., 3,000) of gallons of fuel per year. Fuel cost may constitute 30% or more of operating expenses. A run to traps may cost $600.00 for fuel and take 18 hours of work.

Thus, a fisherman that is going to make a large investment in time and fuel costs desires as large a harvest as possible. Therefore, a need exists in the art for improved sea life harvesting.

SUMMARY

Embodiments of the present invention address the concerns of modern fishermen by providing apparatuses, methods, and systems for making the harvesting of sea life efficient. For example, embodiments provide real-time, periodic, or update upon request information about the status of the many or sample traps a fisherman may have set. In this way, a fisherman can determine the best time for making a run to retrieve the traps, as well as reset them in locations shown to have increased catch.

In another embodiment, methods and algorithms are implemented in a computerized system that provides data to the fisherman indicating the best time to check and harvest the traps. Such a computerized system can be programmed with a predetermined set of criteria for a best time to check the traps. For example, criteria can include the status of the various traps (e.g., the number of traps that contain trapped sea life). Other criteria may include the position of the traps and a consideration of the time required to reach the traps. Such criteria can be important because it can be expected that for distant traps, some of the trapped sea life may escape in the time necessary to reach them at sea.

These and other embodiments can be more fully appreciated upon an understanding of the detailed description of the invention as disclosed below in conjunction with the attached figures.

BRIEF DESCRIPTION OF THE DRAWINGS

The following drawings will be used to more fully describe embodiments of the present invention.

DETAILED DESCRIPTION

Figure 1:
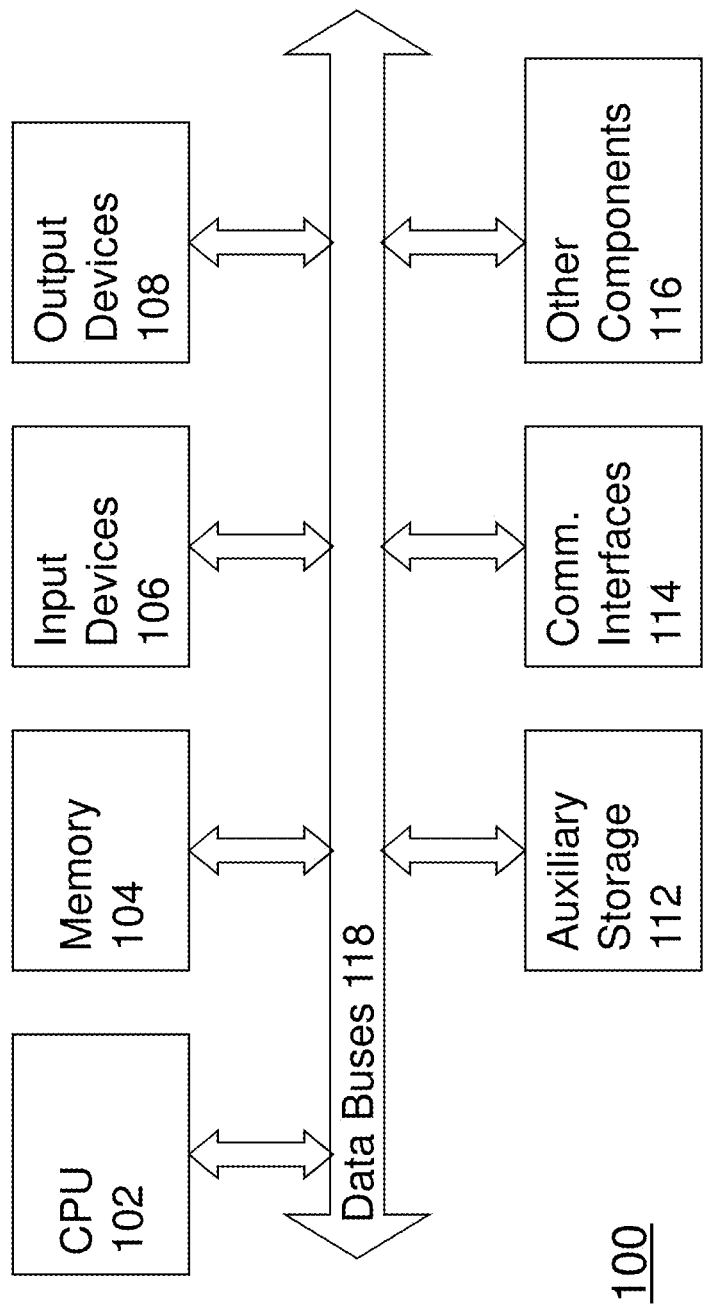
FIG. 1 is a block diagram of one embodiment of a computer system for use with crustacean traps.

Among other things, some of the present embodiments relate to methods, techniques, and algorithms implemented in a digital computer system 100 such as generally shown in FIG. 1. The computer may be located in any of various locations, such as a buoy, a trap, a boat, or on shore. Networks of such computers may be used. Such a digital computer may include the following:

Computer system 100 may include at least one central processing unit 102 but may include many processors or processing cores. Computer system 100 may further include memory 104 in different forms such as RAM, ROM, hard disk, optical drives, and removable drives that may further include drive controllers and other hardware. Auxiliary storage 112 may also be included that can be similar to memory 104 but may be more remotely incorporated such as in a distributed computer system with distributed memory capabilities.

Computer system 100 may further include at least one output device 108 such as a display unit, video hardware, or other peripherals (e.g., printer). At least one input device 106 may also be included in computer system 100 that may include a pointing device (e.g., mouse), a text input device (e.g., keyboard), or touch screen.

Communications interfaces 114 are provided where computer system 100 is deployed as a distributed computer system. Computer interfaces 114 may include LAN network adapters, WAN network adapters, wireless interfaces, Bluetooth interfaces, modems and other networking interfaces as currently available and as may be developed in the future.

Certain embodiments are intended to be implemented in marine implementations including underwater situations. Accordingly, computer interfaces 114 may include interfaces with, for example, underwater acoustic communication (UAC) and hydrophone interfaces as well as interfaces for vector sensor receivers. Still others include interfaces for very low frequency and extremely low frequency radio transceivers.

Computer system 100 may further include other components 116 that may be generally available components as well as specially developed components. Computer system 100 incorporates various data buses 118 that are intended to allow for communication of the various components of computer system 100. Data buses 118 include, for example, input/output buses and bus controllers.

Indeed, the present embodiments are not limited to computer system 100 as currently known. Instead, the present embodiments may be deployed in future computer systems with more advanced or different technology. It is expected that computer technology will continue to advance but one of ordinary skill in the art will be able to take the present disclosure and implement the described teachings on the more advanced computers or other digital devices such as mobile telephones or "smart" phones as they become available. Moreover, the present embodiments may be implemented on one or more distributed computers. Still further, the present embodiments may be implemented in various types of software languages including C, C++, and others. Also, one of ordinary skill in the art is familiar with compiling software source code into executable software that may be stored in various forms and in various media (e.g., magnetic, optical, solid state, etc.). One of ordinary skill in the art is familiar with the use of computers and software languages and, with an understanding of the present disclosure, will be able to implement the present teachings for use on a wide variety of computers.

Figure 2:
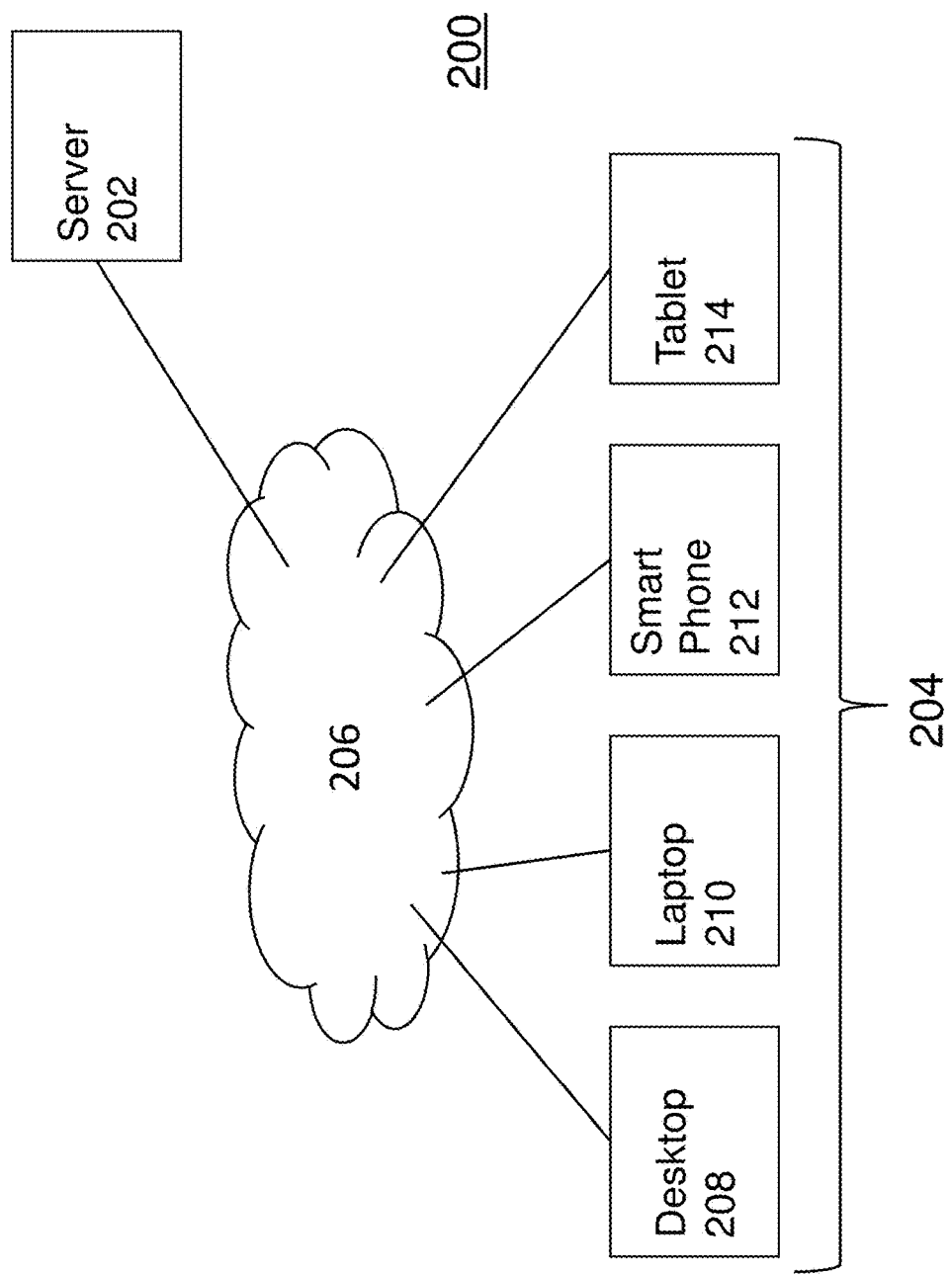
FIG. 2 is a block diagram of one embodiment of a computer network for use with crustacean traps.

In an embodiment as shown in FIG. 2, a computer server 202 that implements certain of the methods is remotely situated from a user. The computer server 202 is communicatively coupled so as to receive information from a user; likewise, computer server 202 is communicatively coupled so as to send information to a user. In an embodiment, a user-computing device 204 is incorporated so as to access computer server 202 via network 206. Network 206 can be the Internet, a local network, a private network, a public network, or any other appropriate network as may be appropriate. The server 202 may perform processing and/or communications functions for or along with the user-computing device 204.

Certain embodiments are intended to be implemented in marine implementations including underwater situations. Accordingly, marine and underwater communication devices can be implemented into network 206. Appropriate communication devices can include underwater acoustic communication (UAC) devices and hydrophones as well as vector sensor receivers. Still other communication devices include very low frequency and extremely low frequency radio transceivers. Moreover, sea-to-shore communications can be implemented into network 206. For example, transceivers implemented in buoys or other flotation devices may be appropriate. Satellite, cellular, microwave, direct, indirect, or other wireless communications may be used.

User computing device 204 can be implemented in various forms such as desktop computer 208, laptop computer 210, smartphone 212, or tablet device 214. Other devices that may be developed and are capable of the computing actions described herein are also appropriate.

Embodiments relate to graphical user interfaces (GUIS) that may be implemented in a computing device. Such GUIs can be implemented using hypertext, java, perl, and other coding techniques as known to those of ordinary skill in the art. Any GUI supported by or provided with an operating system may be used.

In the present disclosure, computing and other activities will be described as being conducted on either computer server 202 or user computing device 204. It should be understood, however, that many if not all of such activities may be reassigned from one to the other device while keeping within the present teachings. For example, computations that may be described as being performed on computer server 202 may have such computations instead performed on user computing device 204.

In an embodiment, computer server 202 is implemented as a web server on which Apache HTTP web server software is run. Computer server 202 can also be implemented in other manners such as through the use of an Oracle iPlanet Web Server. In an embodiment, computer server 202 is a UNIX-based machine but can also be implemented in other forms such as a Windows-based machine. Configured as a web server, computer server 202 is configured to serve web pages over the network 206.

In an embodiment, user computing device 204 is configured so as to run web browser software. For example, where user-computing device 204 is implemented as a desktop computer 208 or laptop computer 210, currently available web browser software includes Internet Explorer, Firefox, and Chrome. Other browser software is available for different applications of user computing device 204. Still other software is expected to be developed in the future that is able to execute certain steps of the present embodiments.

In an embodiment, user-computing device 204, through the use of appropriate software, queries computer server 202. Responsive to such query, computer server 202 provides information so as to display certain graphics and text on user computing device 204. In an embodiment, the information provided by computer server 202 is in the form of HTML that can be interpreted by and properly displayed on user computing device 204. Computer server 202 may provide other information that can be interpreted on user computing device. Other arrangements may be used, such as different devices communicating and/or displaying based on purpose built applications rather than publically available browsers or communications.

In the present disclosure, embodiments will be described with general reference to lobster trapping. Such descriptions are provided as exemplary and are not limiting. For example, the teachings are not limited to lobster trapping. Other embodiments include applications to crab trapping as well as fishing. For example, the various traps described below are readily extendible to crabs. Moreover, the various traps described below are also extendible to fish nets and other sea life harvesting techniques. In any case, for ease of description but without limitation, embodiments described with reference to lobster traps will be provided.

Embodiments may involve one or more of the following:

1) Sensors and other circuitry to detect when a lobster or crab is in a trap

2) Methods for characterizing how much catch is in the trap

3) A transmission path from the trap to the surface of the water

4) A transmission path from the water surface back to a shore-based or boat-based receiver.

Figure 3:
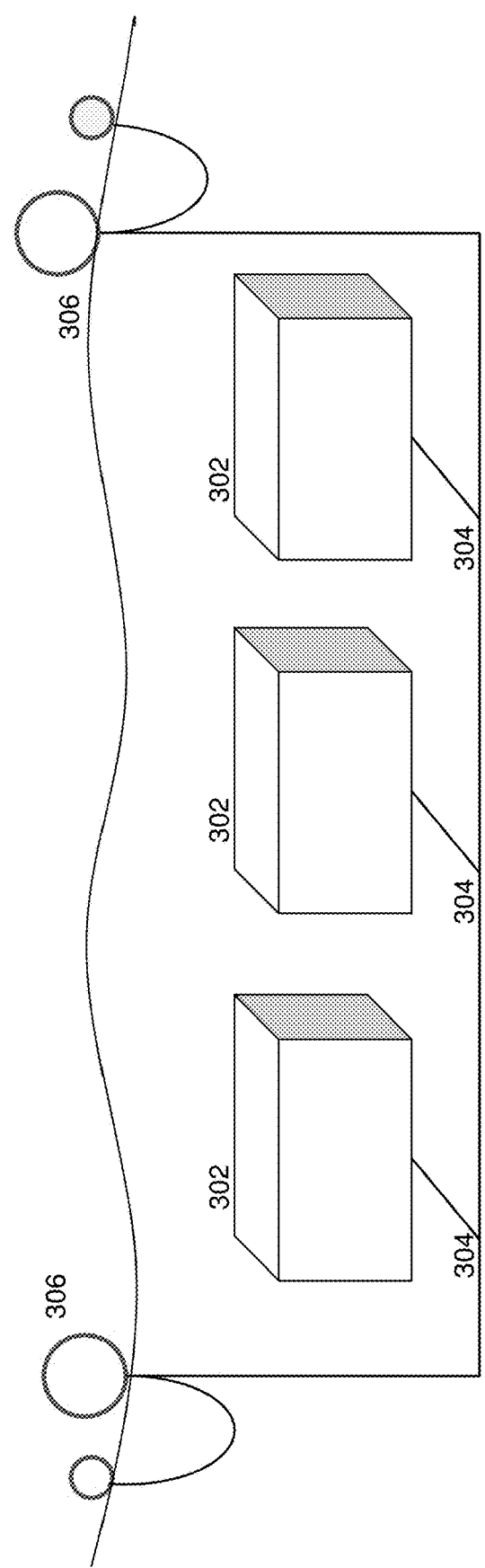
FIG. 3 is a schematic representation of an exemplary configuration for setting sea life traps.

5) A user interface to indicate the state of a trap as well as suggestions for checking the traps 6) Post-processing of the trap data to determine fishing performance trends over time and location Crab and lobster traps are set either as a single trap with a pair of buoys connected to the trap for aiding in identification and retrieval by the fisherman, or multiple traps connected together. An embodiment according to the latter setup for lobster traps is shown in FIG. 3. Several traps 302 are connected by lines 304, with buoys 306 at either end or other locations.

Figure 4:
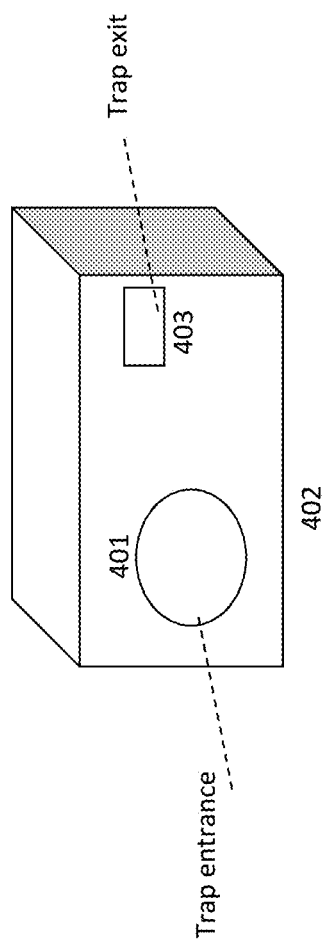
FIG. 4 is a schematic representation of a lobster trap with an entrance opening for animals, and an exit opening for smaller animals to escape.
Figure 5:
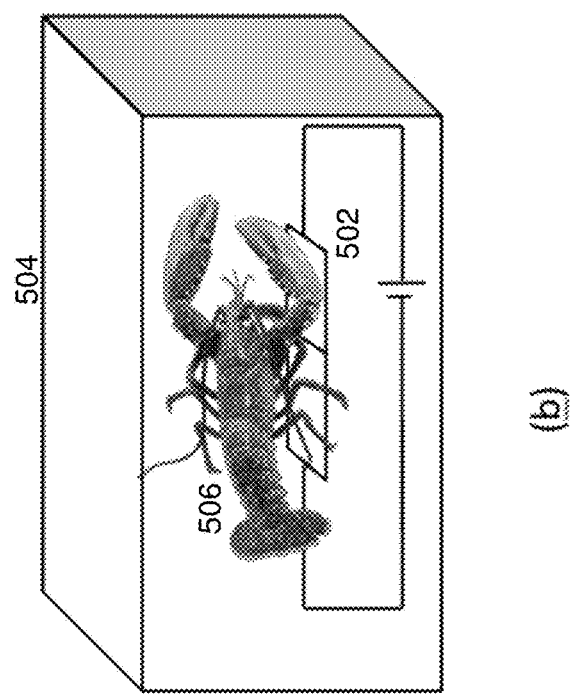
FIG. 5 is a diagram of a trap with a lobster presence sensor mechanism according to an embodiment.
Figure 5:
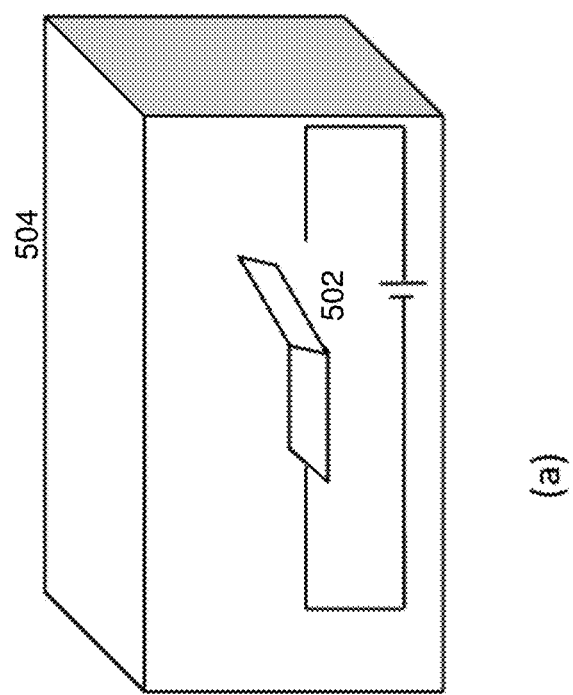

An embodiment includes sensors and other circuitry for detecting the presence of a catch in a trap. FIG. 4 shows the entrance 401 and exit 403 openings, or vents, in a trap 402. A trap may have any number of entrances 401 and exits 403, such as two entrance vents and two exit vents. There are two different embodiments for how to detect catch in the trap: 1) use of a mechanical sensor to be depressed by the marine life, or 2) instrumentation of trigger gates on the entry and exit vents of the trap. For the first embodiment, an electrical circuit design can be put in place in the trap that it is normally an open circuit. When a crab or lobster crawls into the trap, its weight on the bottom of the trap compresses a mechanical switch that closes the circuit and causes electrons to flow. As the catch moves on through the trap, the circuit is open again. For example, an embodiment of the present invention includes a switch 502 within trap 504 that senses the presence of a catch as shown in FIG. 5. As shown in FIG. 5, with the presence of a catch 506, the switch 502 is closed. Closure is interpreted by analog or digital circuitry as the presence of a catch. The number of times the switch is depressed can be counted and logged by a microprocessor in the electrical circuitry. Toward determining the size of a catch, other embodiments include a weight sensor such as a strain gauge device. In such an embodiment, the size of the catch can be evaluated based on weight. In another embodiment, an average weight of a sea life of interest (e.g., lobster) may be considered so as to estimate the number of specimens caught.

Figure 6:
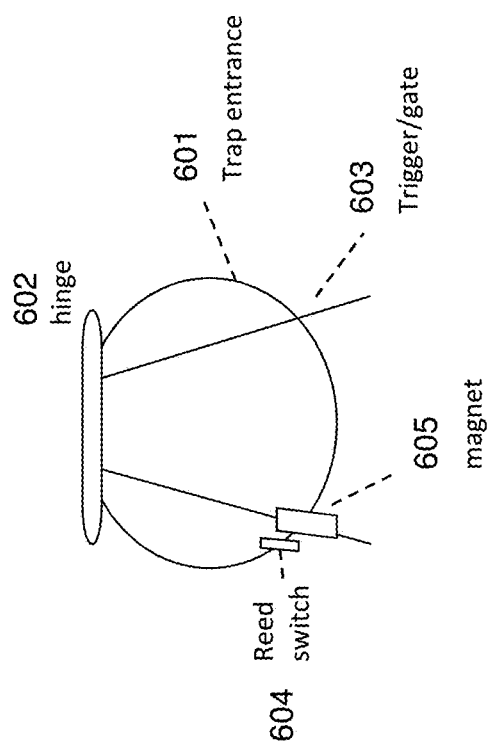
FIG. 6 is a schematic representation of one embodiment of an instrumented gate on the entrance opening of a trap.

Traps may have "triggers" or one-way hinged gates on the entry vents of the traps that prevent the animals from escaping back out through the entrance. In the second embodiment, the entry and/or exit ports of the trap can be modified with gates that are instrumented with sensors to detect when an animal enters and/or exits the trap. Tracking the number of entrances and exits will result in a running count of the number of specimens contained in the trap. An example of how to implement this embodiment is shown in FIG. 6. The entry trigger 603 is instrumented with a magnet 605. The entry vent 601 is instrumented with a reed switch 604 that detects whether the magnet mounted on the trigger is near or far, or the trigger is closed or open. Other sensor arrangements may be used, such as contact sensors, strain gauge, or acoustic.

The entry trigger 603 can also be designed to be selective, so that only the desired or legal-sized catch is able to fit through, and provide adequate force to open it. An embodiment is to add crossbars to the gate that create a grid equivalent in size to the net mesh of the trap, and to hold the trap closed with either a magnetic or spring force that only a crustacean or desired catch could push open. The intent of this is to reduce bycatch in the trap, and reduce the ability of the trap to continue fishing if it is lost (also known as "ghost fishing"). An embodiment is to use a solid but flexible flap that is instrumented to count the catch entering and exiting to allow for smaller species or fish to be detected. Other types of mechanical triggers may be used to count. As will be described further below, weight, count, and/or other information can be displayed on a graphical user interface.

In an embodiment, sensors and circuitry are provided that record when a catch is detected. That a catch is detected may be recorded without indication of when. In other embodiments, sensors and circuitry (e.g., strain gauge, port sensor, and/or load cell circuitry) are provided to indicate how much catch is present in the trap. Another embodiment may include other sensor information such as amount of bait left. This is of use to the fisherman in helping to inform their decisions on whether to leave the traps longer. Another type of sensor may provide information regarding the oceanographic forces on the trap, which can be useful in determining why the trap might be empty or full depending on the effect of the conditions on lobster or crab behavior. An embodiment may be to include temperature, ocean acidity, and other environmental sensors to the trap. Combined with amount of catch data, this information may provide information on environmental effects on species behavior and location. The circuitry may be located away from the sensors, such as outside the trap or in another computerized device. In still other embodiments, circuitry is provided for relaying the detected information to an onshore or boat system as will be described further below.

In certain embodiments, the sensors and other circuitry can be analog and/or digital circuitry encased in a water-tight container and powered by a battery. Preferably, for long battery life, the circuitry is designed to use very little power. For example, the circuitry can be in a dormant state until the tripping of sensor 502. Upon tripping sensor 502, the circuitry may perform its various functions to assess the catch and relay the information. At such point, the circuitry may return to a dormant state. Underwater connectors are used for the sensor to the water-tight circuit box, and from the box to the tether or other communications instruments. Brackets are used to mount the reed switches to the trap.

In another embodiment, the provided battery may be a rechargeable battery that can be recharged by motion or ocean currents in which the device is expected to operate. In this way, maintenance is reduced and the integrity of the circuitry is increased.

In another embodiment, signal processing is provided to interpret the data generated by the sensors and circuits within the traps. For example, in an embodiment, data generated by the detector contains an identification of the particular trap that has detected a catch, and how much weight is inside the trap (reflecting the total catch per trap). Embodiments perform these functions in analog and/or digital circuitry. Analog or digital encoded data particular to each trap or string of traps is used.

Figure 7:
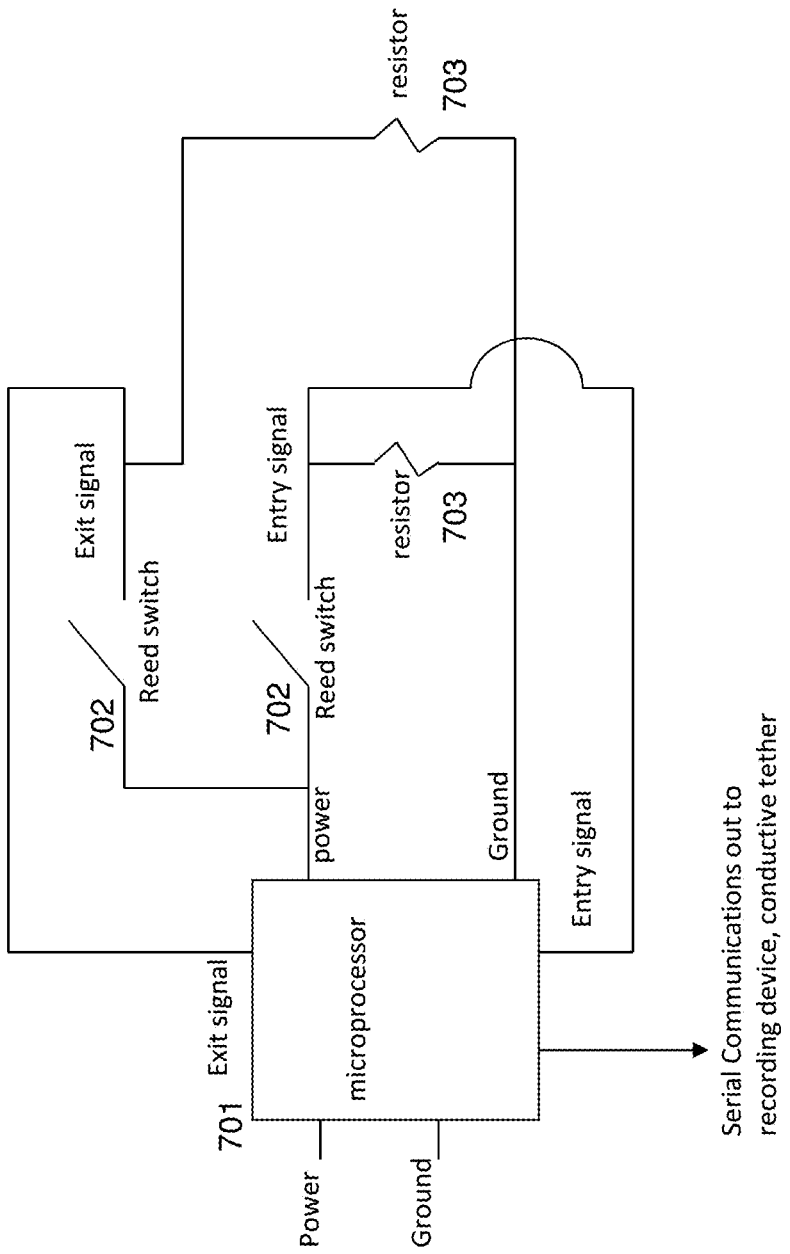
FIG. 7 is an electrical schematic of one embodiment of a sensor mechanism on a trap.

In an embodiment, microprocessors can be used to process the data and determine the appropriate information to convey regarding the status of the trap. For the example where the gates are instrumented to count the entries and exits of animals into and from the trap, the wiring of this embodiment is shown in FIG. 7. Battery or tether-supplied power is applied to the microprocessor 701, which then is programmed to look for digital inputs from the switch circuits. Normal-closed reed switches 702 are placed on the entrances and exits of the trap, with magnets on the gates of each. The reed switches 702 are isolated from the trap itself to avoid unplanned short circuits. Resistors 703 in the loop help regulate the current flow. When the gate is opened, the switch 702 will be closed and create a digital high reading to the associated digital input to the microprocessor. The entry counts are incremented, and the exit counts are decremented from the running count. The running count is then sent, along with trap identification, out the serial port of the microprocessor. Additional components may be added to this basic architecture to enhance or amplify the electrical signals as needed. If the trap is to be used for fish instead of crustaceans, the gates are modified to be more numerous and closer together to accommodate the smaller cross-sectional area of those animals. The microprocessor must resets the count prior to launch of each instrumented trap.

If the data is not transmitted to the water surface or to shore, the trap-level components form a stand-alone device to record the data. The microprocessor is connected to a board containing a data recording device, such as an SD or micro-SD card. The specimen count data is sent to the data card by the microprocessor at set periods. The stored data can be downloaded upon retrieval of the trap and processed for data trending purposes over time by connecting the data card to a computer on the boat or on land. In other embodiments, the sensor data is communicated without storage.

Figure 8:
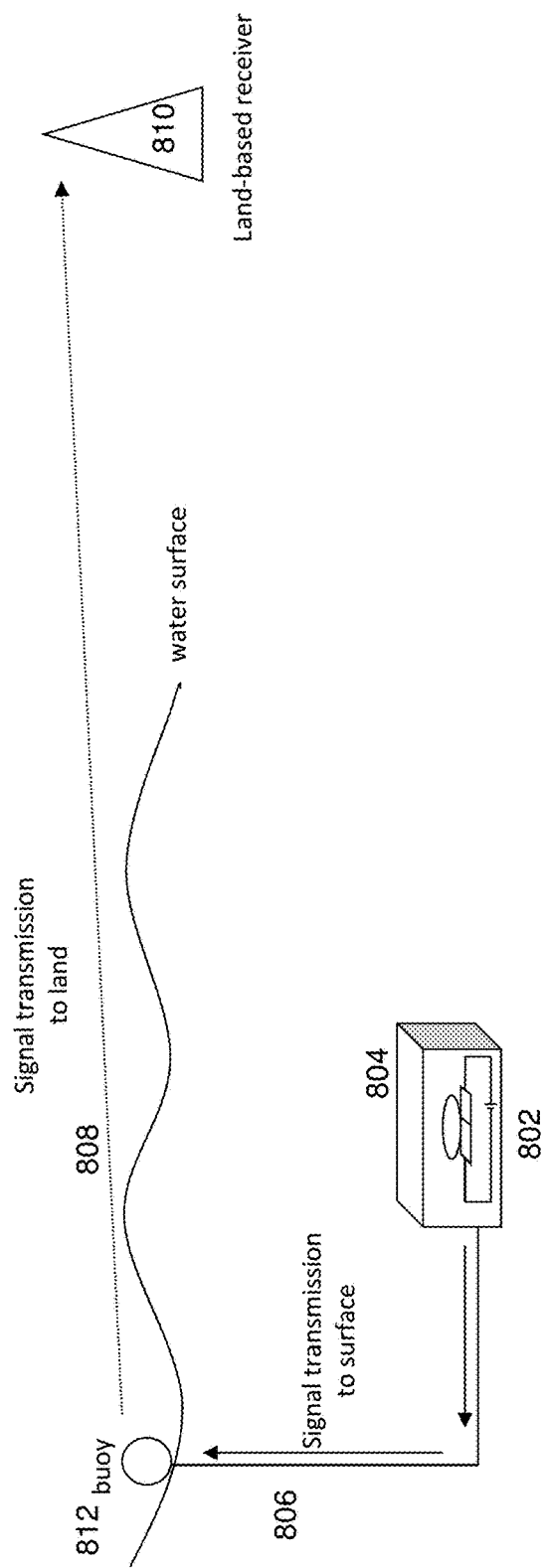
FIG. 8 is a diagram of a communication scheme using electrical conductors according to an embodiment.

FIG. 8 shows an embodiment wherein the various data generated by the sensors and circuits 802 are electrically transmitted using lines 806 (similar to lines 304 of FIG. 3). For example, data from each trap 804 indicate trap identification and status of trap (e.g., total weight of catch inside and/or total count of specimens inside). There is no indication of what type of species are inside the trap; rather it is a measure of how much catch is inside the trap. This simplifies the data that needs to be sent to be small amounts of numerical data only, allowing for methods of transfer and processing that are efficient in both time and power required, and reducing the cost of the necessary components. It also provides the most relevant information to the fisherman that can be analyzed quickly via the GUI.

There are 3 different embodiments for transmitting the data from the trap to the surface: 1) direct conductor connecting the trap to a surface buoy, 2) acoustic transmission from the trap to a surface buoy, or 3) release of a communication line to the surface upon deployment. In the embodiment shown in FIG. 8, lines 806 are designed with the appropriate characteristics to hold the cages but are also designed with electrical conductors to transmit the analog or digital data generated by sensors and circuits 802. For example, in an embodiment, lines 806 may be designed with a two-wire serial bus that can transmit serial digital or analog data from the sensors and circuits 802. The electrical data lines can be embedded into or wound around the existing trap lines, or set up as a separate line to either the same buoy or a dedicated communications buoy. In another embodiment, lines 806 may be designed with many individual conductors for transmitting analog or digital data in parallel. In still another embodiment, fiber optics are embedded within lines 806. In another embodiment, inductive transmission would be used along lines 806. The buoy 812 could also be reeled in at the conclusion of the trap soak time, prior to retrieval by the fisherman, for ease of operations. Wireless (e.g., acoustic) communications may be used as described below.

Figure 9:
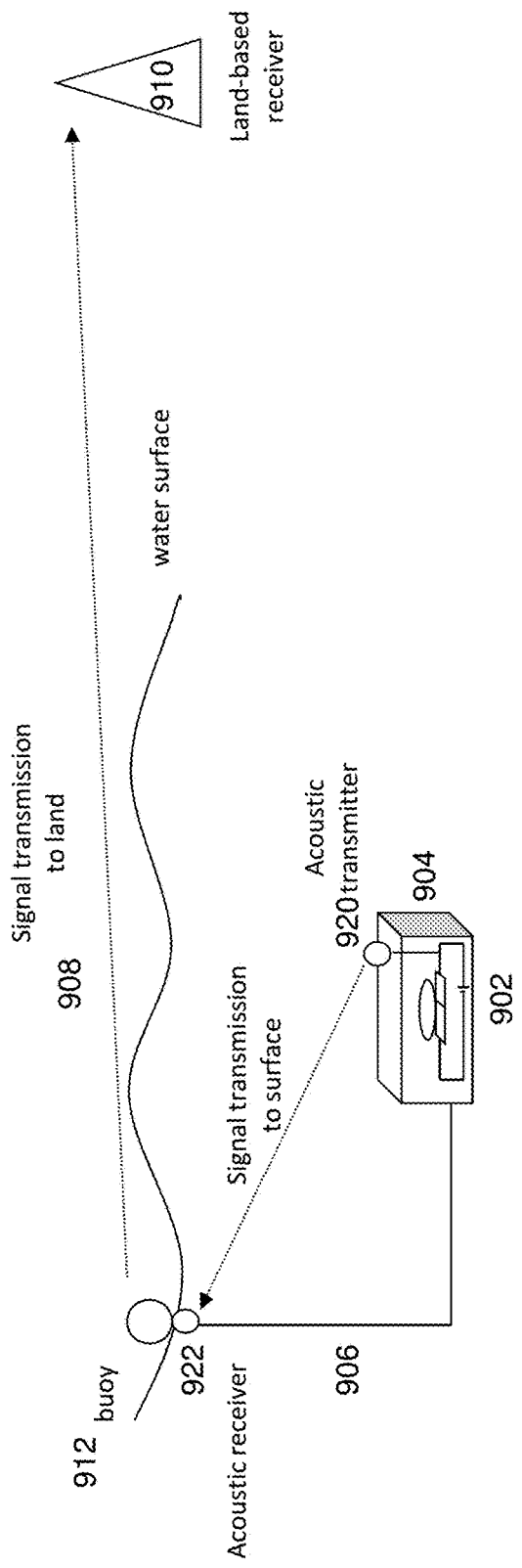
FIG. 9 is a diagram of an acoustic communication scheme according to an embodiment.

In another embodiment shown in FIG. 9, an acoustic transmitter 920 is coupled to sensor and circuits 902 within trap 904. As shown, acoustic transmitter 902 is designed to generate an acoustic signal that is received by a hydrophone or acoustic receiver 922 within or on buoy 912. The acoustic signal contains the data for the trap, using standard acoustic communications protocols. A converter translates the acoustic signals back to digital information on the buoy.

Figure 10:
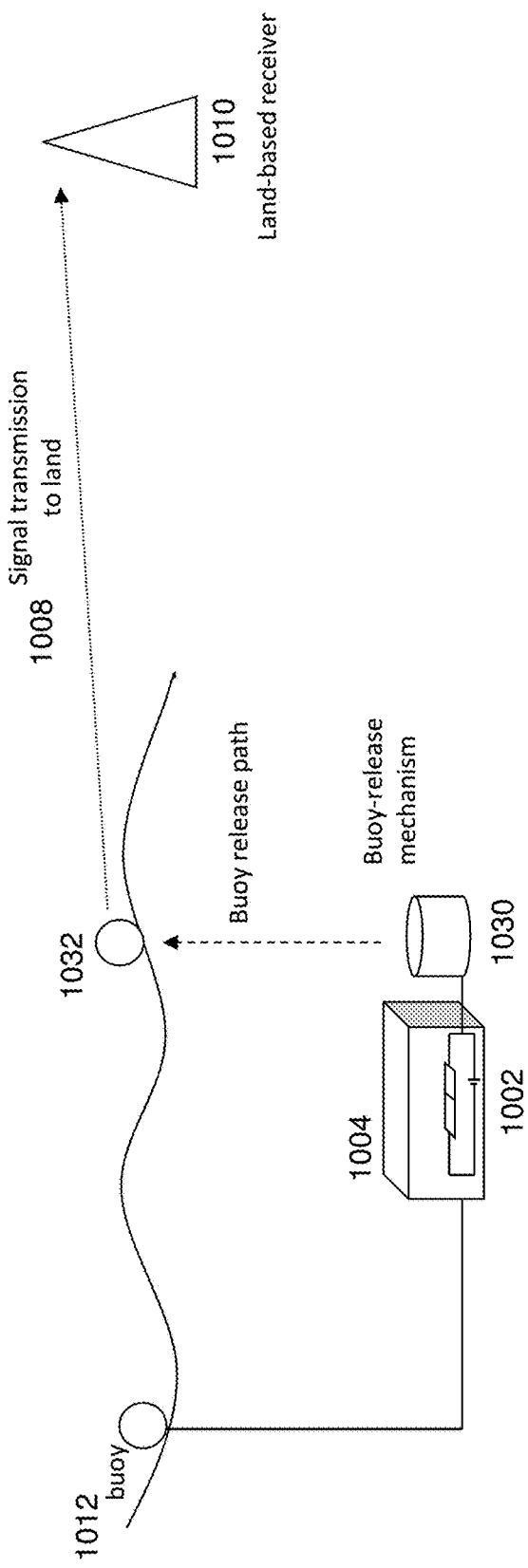
FIG. 10 is a diagram of a buoy communication scheme according to an embodiment.

In another embodiment, a buoy release system is implemented as shown in FIG. 10. As shown, a buoy release mechanism 1030 is coupled to sensor and circuits 1002 within trap 1004. This is implemented using a mechanical reel held in place by a latch. The latch is released by a small actuator or servomotor driven by the microprocessor. As shown, buoy release mechanism 1030 is designed to release buoy 1032 when the first transmission of a message is desired (e.g., when a trap is full, or upon deployment to the ocean floor). In an embodiment, the buoy 1032 can either remain connected to the trap via a tether, which can also be used for communication of data. When buoy 1032 is released and reaches the surface of the water, communications between the trap can then be established. Where the buoy 1032 is not tethered, the communications are between the buoy 1032 and the receiver 1010, not with the trap 1004. The buoy 1032 could also be reeled in at the conclusion of the trap soak time, prior to retrieval by the fisherman, for ease of operations. The locking mechanism on the mechanical reel used to release the buoy is unlocked, to reel the buoy back down to the trap. In another embodiment, the released buoy is not connected to the trap, but is used only for communications to the land-based receiver. In this implementation, the data must be transferred to the buoy prior to release, or wireless or acoustic communications between the buoy 1032 and the trap 1004 are used. The transmission path can include the various transmission paths discussed above with reference to other embodiments as well as others known to those of ordinary skill in the art.

Figure 11:
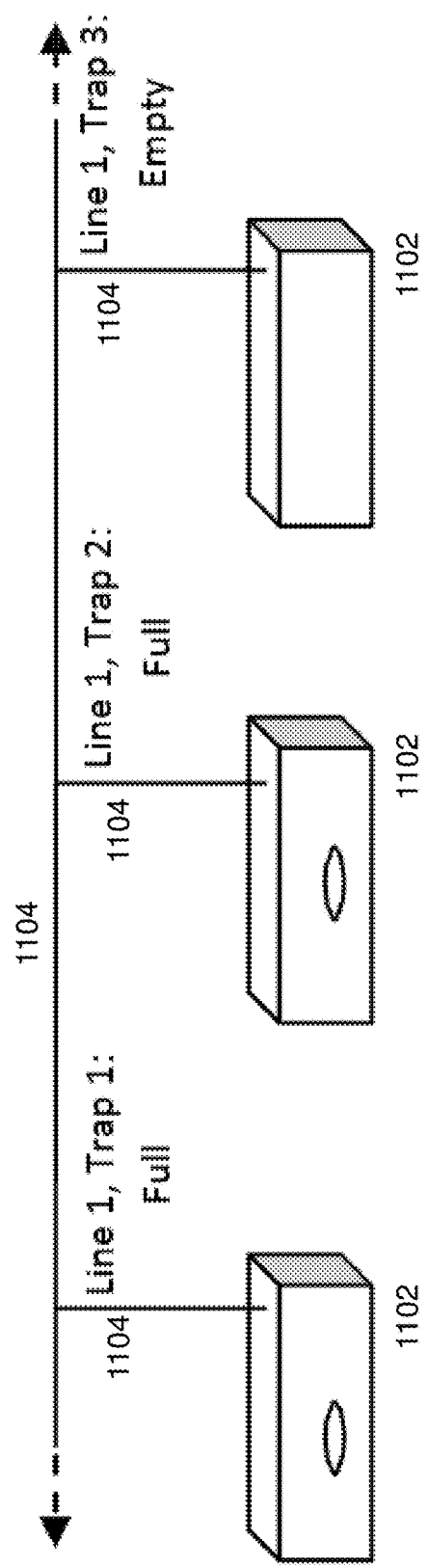
FIG. 11 is a diagram of a network of traps according to an embodiment.

For purposes of illustration, shown in FIG. 11 is a condition where two traps are full and one trap is empty. Trap-level sensors and circuits 1102, therefore, transmit such information by lines 1104. Ultimately, this and other trap information are collected to provide useful information to a fisherman about the status of the traps. In another embodiment, a reduced number of traps per line are instrumented to provide representative information for the entire set of traps.

In another embodiment, the buoy connected to the instrumented trap also has a Global Positioning System (GPS) antenna. This information can be combined with the specimen data being transmitted to the shore or boat, allowing the fisherman to determine the location of the traps that are identified as needing retrieval, beyond the identification already provided. In addition, this information can be trended over time to determine the locations providing the best results, informing future trap deployments.

In the current discussion, sensors and circuits have been described as generating certain information to a buoy associated with the trap(s). To ultimately make such information useful, it is delivered to the fisherman. In an embodiment, this is accomplished by delivering the sensor and circuit information from the traps to an onshore system via a sea-based buoy with transmission capabilities, such as shown in FIGS. 8, 9, and 10. For example, in FIG. 8, when a sensor is tripped, sensor and circuits 802 within trap 804 generate data that are transmitted along a data delivery path 806 and data transmission path 808 and ultimately delivered to an onshore system 810. In another example, the sensors are always functioning, but the data is transmitted only at certain intervals or upon request from the user. Periodic updating may be used, such as every 15 minutes or hourly. The frequency of this transmission can be set by system designer, the fisherman, or the user. In these implementations, the information from the trap is being passed to the fisherman, with no action on their part required except to potentially request the data. The fisherman is not required to constantly monitor the trap. The data is available whenever it makes the most sense for the fisherman to do so, whether before the boat leaves the dock, or onboard while enroute to retrieve the traps.

In an embodiment, data delivery path 806 is as described with reference to FIG. 8 but still other embodiments can be implemented as would be known to those of ordinary skill in the art.

In an embodiment, data transmission path 808 is a wireless transmission path wherein a transmitter or transceiver is mounted on buoy 812 and a land-based or boat-based receiver or transceiver is coupled to onshore or boat system 810. For example, data can be transmitted via radio, cellular, or satellite links to a land-based receiver.

Figure 12:
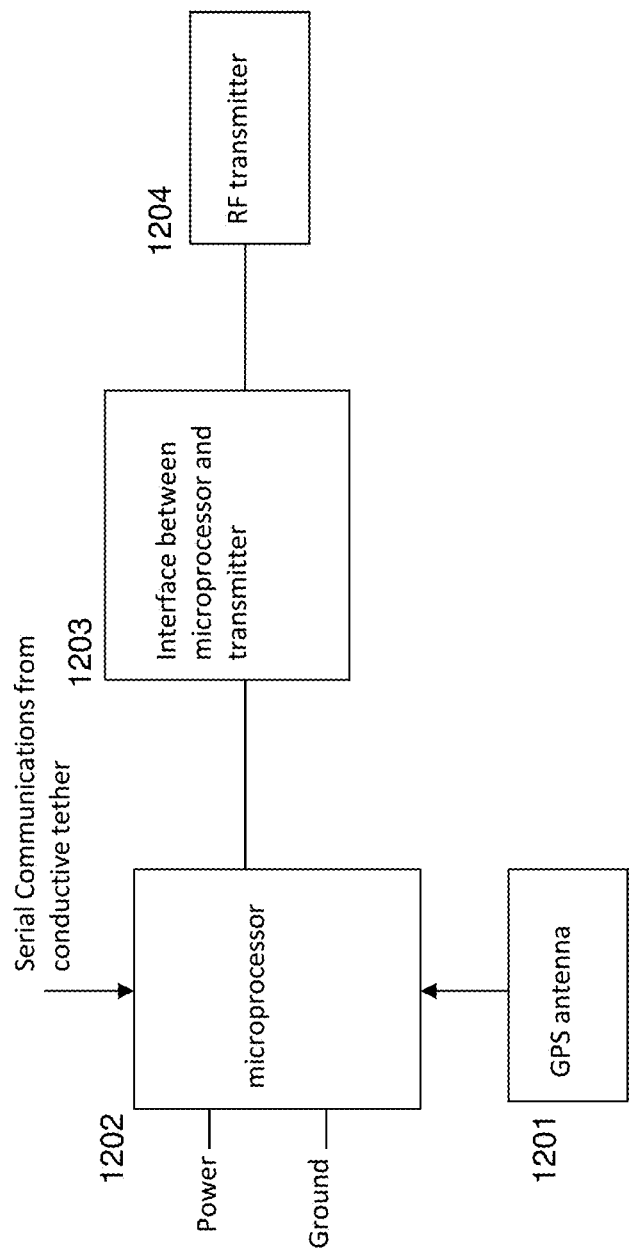
FIG. 12 is a schematic of example buoy components used for communications.

An example of how this could be implemented on the buoy is shown in FIG. 12. The tether or other means of serial communication reaches the buoy via marine-standard connectors. If a GPS antenna 1201 is also used on the buoy, both pieces of data are accessed by a microprocessor 1202, such as an Arduino microprocessor, on the buoy. The microprocessor generates the data to be relayed via the radio frequency (RF) transmitter, or other transmission device. If GPS is not used, the serial data from the trap can be input directly to the RF transmitter 1204 without the need of a microprocessor. If a microprocessor is to be used, a standard interface device 1203, such as an Arduino shield, may provide wireless communications. This output would then feed directly into the RF transmitter 1204. All of this equipment is designed to withstand the marine environment in terms of waterproofing and weatherproofing, including underwater connectors and cables. The buoy can either be an existing buoy used for locating and retrieving the traps, or a separate buoy connected to the instrumented trap.

The type of transmission can depend on where the trap is set, and what the line-of-sight distance is to a receiver. For each buoy 812, for example, the number of traps that are full, and the total weight inside each, can be transmitted. Alternatively, the buoy 812 passes on the sensor or trap information without further processing. The calculation of number of traps is performed by the computer or server on the boat or land.

In an embodiment, the communication will be encrypted in order to prevent competing fisherman from intercepting data from others' buoys.

Wireless transmission systems can be implemented in many ways as would be known to those of ordinary skill in the art. For example, direct sea-to-land systems can be implemented. Alternatively, sea-to-satellite-to-land systems can be implemented. In still other embodiments, mesh communication systems can be used for sea-to-sea communications (e.g., between buoys) and ultimately for sea-to-land or boat communications. Still other implementations are possible as would be known to those of ordinary skill in the art. The communications may be from sea-to-land-to-boat.

Embodiments of the present invention include methods and algorithms to deliver information to a fisherman on a graphical user interface (GUI) such as may be presented on a computer, tablet, or smartphone. Moreover, the methods and algorithms lend themselves to the computer systems as described with reference to FIGS. 1 and 2.

Figure 13:
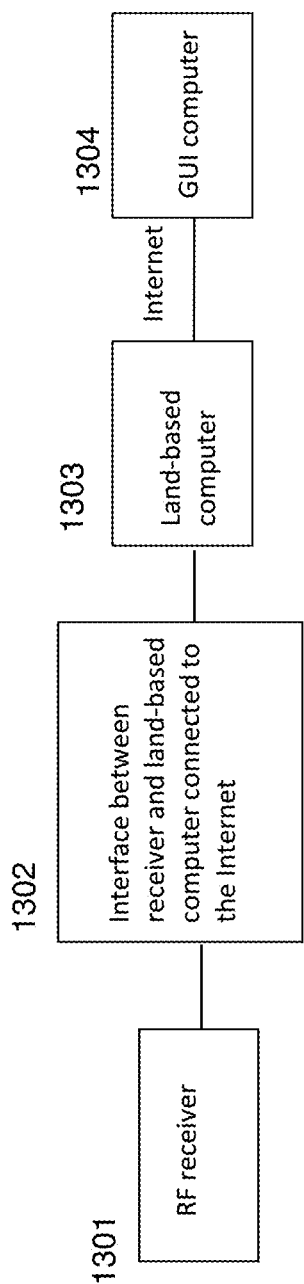
FIG. 13 is a schematic of an embodiment of the communications devices on shore to receive and display the information received from the trap via a buoy transmitter.

An example of how the data would be received from the buoy and communicated to the GUI display device is shown in FIG. 13. The RF receiver 1301 on land is positioned to receive the data from the buoy transmitter. This receiver 1301 is then connected to an interface device 1302 that transmits the data to the internet via a computer 1303. The interface device 1302 is a network card. The fisherman can then access their data either at their home computer 1303 or other internet-connected device, such as a smart phone or tablet, which is supplied with the software to display the GUI, or to a separate GUI computer 1304. This data is encrypted so that only the fisherman can access their specific data. If desired, an RF receiver can also be positioned on the fisherman's boat to receive their data onboard, without the data going to land first.

In an embodiment, GUI includes maps (e.g., maritime maps) that show the positions of the various traps as well as estimates of the time required to reach such traps, along with the count data. In still another embodiment, weather and sea current information is also presented.

Figure 14:
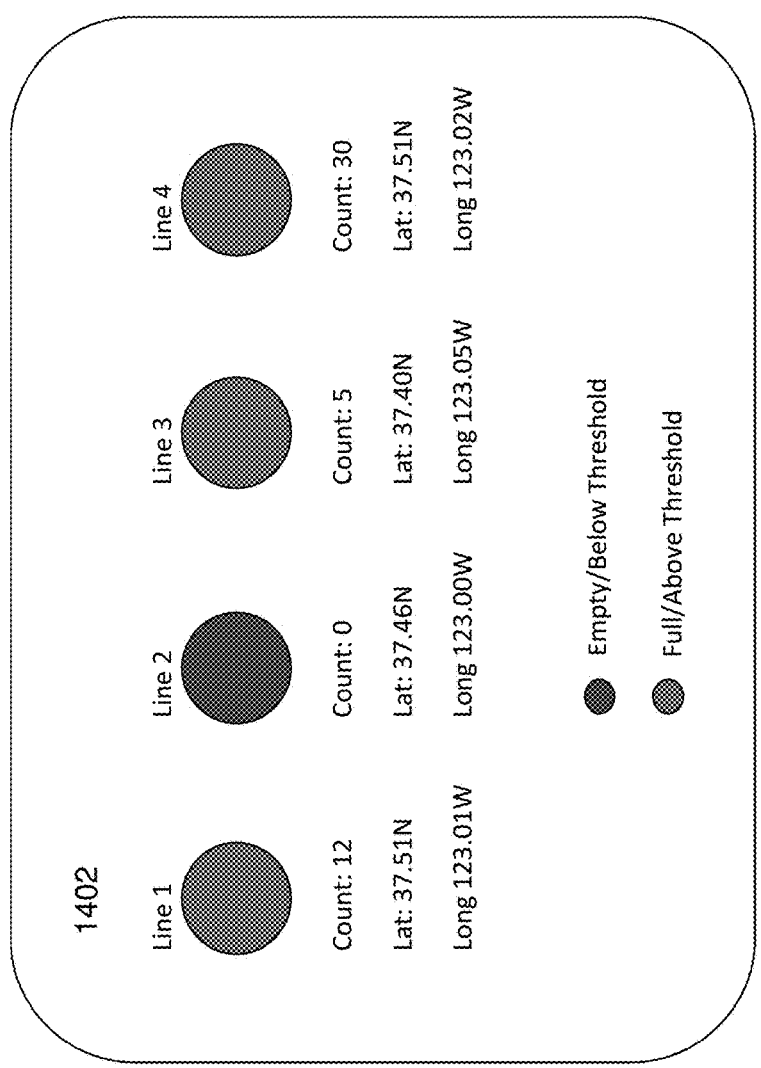
FIG. 14 is a representation of a graphical user interface (GUI) according to an embodiment.

Shown in FIG. 14 is GUI that presents a graphical representation of the traps a fisherman may have set. Information for traps on four lines is shown, but information for any number of traps and/or lines may be provided. GUI 1402 provides information that includes, for example, the state of such traps. As shown, the current running count indicating the number of specimens in a representative trap for each line is displayed, along with the GPS location information of the buoy associated with that trap. In another embodiment, the states of the traps can include an empty or full status. Other information can include information about the status of the bait, the forces on the trap to give an indication of how rough the bottom oceanographic conditions are, or the total weight of the catch inside the trap. In still another embodiment, an indication can be displayed as to whether the amount of catch has recently changed (e.g., increased or decreased) indicating a change in status of a given trap, or other equivalent time lapse data. Where all of the traps are equipped with sensors, information for the traps of a given line may be provided separately (e.g., a table) and/or in aggregate. For example, an average weight or count is provided. By selecting the average, a table of counts or weights per trap is provided on the GUI 1402.

For quickly identifying which lines and traps are ready for retrieval, those can be colored (e.g., green) on the display, while those that are relatively empty or below a user-defined threshold can be differently colored (e.g., red) on the display. The threshold at which this division is made can be set by the individual fisherman or a default. Many other embodiments are possible for the GUI to provide the gathered trap information with or without location information.

With this trap information, a fisherman can then make informed decisions regarding operational runs to retrieve and reset traps. When fishermen retrieve their traps, rebait and reset them, the data communicated from the instrumented traps will indicate to the fishermen which lines are capturing more of the intended species before they leave the dock and/or travel to the line. With this information, the fisherman can plan an efficient route to save fuel. For example, the underperforming lines can be retrieved first and subsequently be reset in more productive locations, thus avoiding back-tracking with the boat and saving fuel, as well as relocating lines to improve their total catch. Or, if there is adequate bait remaining, the decision may be to let a line remain in the water to give additional time to catch the target species.

In still another embodiment, automated methods and algorithms are implemented that provide data to the fisherman about when a best time will be to make a run to retrieve his harvest. Such methods and algorithms can take into account the status of the traps as well as the time it will take to reach such traps at sea in order to provide a best time for a fisherman to start his run. Cost criteria, such as fuel consumption, may be included. A comparative analysis may be performed using standard path planning techniques that minimize a cost function (for example, total time, or fuel use as well as maximizing catch) to recommend a sequence of runs to different strings, based at least in part on trap location, average boat speed and mileage per gallon of fuel, and amount of catch in each instrumented trap.

Figure 15:
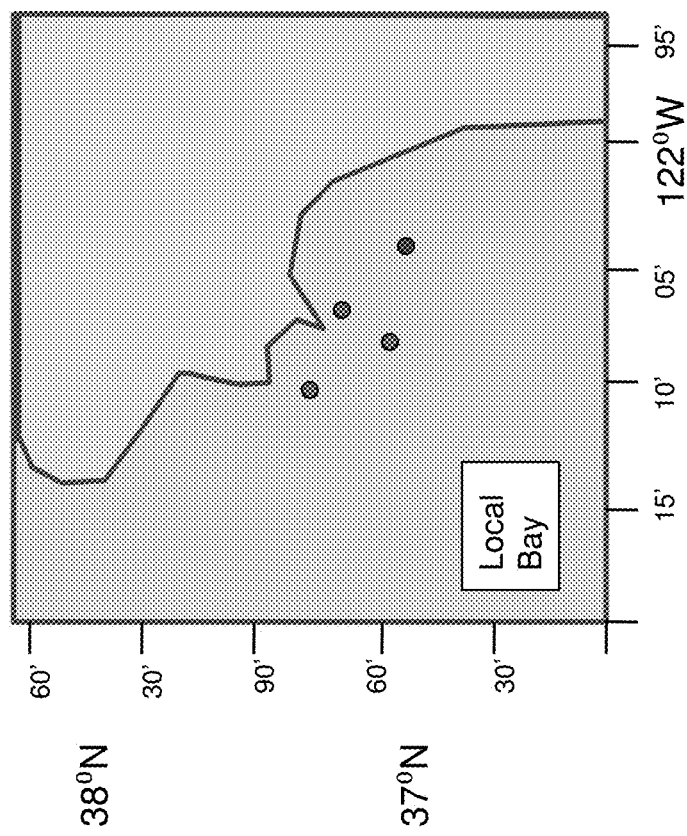
FIG. 15 is a representation of a GUI including a map interface according to an embodiment.

In an embodiment, the GUI includes maps (e.g., maritime maps) that show the positions of the various traps as well as estimates of the time required to reach such traps, as in FIG. 15. In still another embodiment, weather and sea current information is also presented. The GUI may allow switching between different types of information. For example, the map of FIG. 15 is provided on one tab and the count information of FIG. 14 is provided on another. In other embodiments, the count information of FIG. 14 is provided as an annotation on the map or in response to selection of a line in map. As another example, selection of a line, count or location may cause the map to be displaced.

Figure 16:
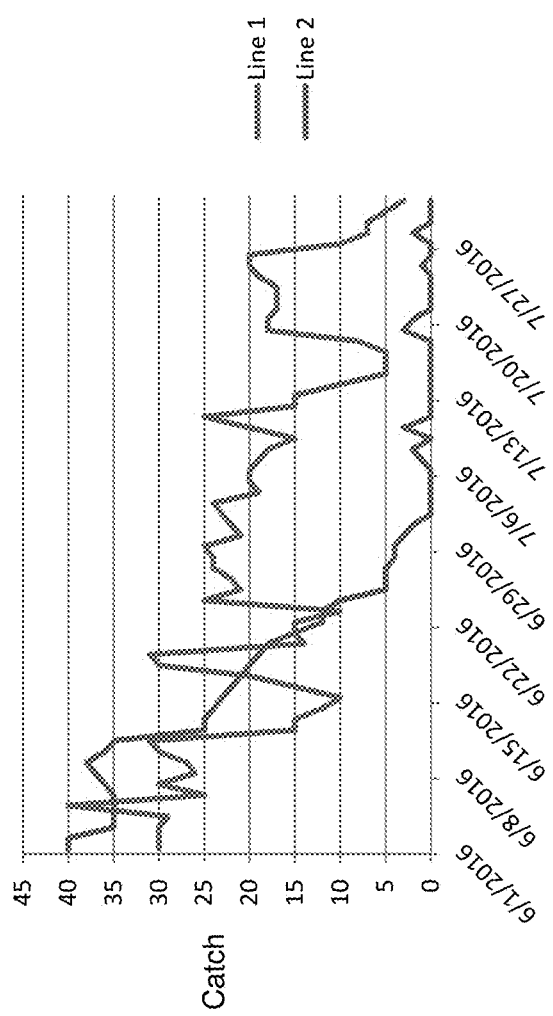
FIG. 16 is a representation of a graph indicating performance of trap lines in different locations according to an embodiment.

The data captured onshore regarding the trap catch status and location can be post-processed to provide trending information over time of performance and efficiency. The amount of catch can be plotted on the y-axis of a 2-dimensional plot, vs. time on the x-axis, as shown by example in FIG. 16. This can be done for each location to help the fishermen visualize their operational performance and better plan operations in the future. In addition, researchers for various fisheries may use this data to note crustacean behavior over a season, or over the course of multiple seasons. The trend may be by location, by trap, by species, and/or other information, such as trap trend for different species over a given period. The abundance trend is shown for one or more locations. Trends across locations may be shown. The trending may be used as part of the cost function for route and/or schedule planning to haul in the different lines.

In other embodiments, specific information is provided to the fisherman regarding what has been caught in their traps in order to avoid retrieving traps that contain bycatch (animals other than those desired to be harvested) or traps containing inadequate catch. For example, a camera can be provided on the trap that could snap a picture of the catch to see if the desired species is in the trap. This could be activated at the same time as the circuit completion for the counter. The picture could be sent digitally. Appropriate communication channels would have to be provided to communicate the images that may require additional bandwidth in the sea-to-land communications. The camera may be used instead or in addition to other sensors. For example, the camera periodically activates. The image is sent to the boat or shore. A computer processes the image to determine a count of the lobsters. Automatic image recognition software could be used to determine if the catch inside the trap is bycatch, or other illegal specimens. This would be useful data for the fishermen in knowing ahead of time to quickly retrieve and relocate traps that are in areas of high bycatch.

In another embodiment, a method and mechanism are provided to release undesired catch, or catch that has not been retrieved within a time limit. In another embodiment, a video or other sensor to detect whether the lobster is illegal is provided to determine if a catch contained in the trap is a male or female. This can be important because, for example, female lobster with eggs are considered illegal catch. In an embodiment, a method and mechanism is provided to release undesired or illegal catch. A door or large vent may be opened by an actuator such as a servomotor to release the catch.

In another embodiment, the buoy is equipped with a depth sensor. If the buoy is submerged below a certain depth for a long period of time (more than several hours), a smaller floatation device is released to the surface to serve as either a passive or active locator for the submerged trap(s) and buoy.

It should be appreciated by those skilled in the art that the specific embodiments disclosed above may be readily utilized as a basis for modifying or designing other game implementations. It should also be appreciated by those skilled in the art that such modifications do not depart from the scope of the invention as set forth in the appended claims.

What is claimed is:

1. A system for generating catch information, the system comprising:
    a marine life trap having a marine life entrance and a marine life exit separate from the marine life entrance;
    a first sensor on the marine life trap, the first sensor positioned to measure a first measure of the marine life entering through the marine life entrance of the marine life trap;
    a second sensor, separate from the first sensor, on the marine life trap, the second sensor positioned to measure a second measure of the marine life exiting through the marine life exit of the marine life trap;
    a transmitter configured to communicate an amount to another device having a graphical user interface for representing the amount, the amount being the first measure reduced by the second measure;
    an onshore receiver configured to receive the amount from the transmitter; and
    a graphical user interface computer configured to access the amount provided from the onshore receiver, wherein the graphical user interface computer is configured to output the amount and a route optimized based on the amount and fuel cost.

2. The system of claim 1 wherein the marine life trap comprises a lobster trap.

3. The system of claim 1 wherein the first or second sensor comprises a magnet and a reed switch.

4. The system of claim 1 wherein the first sensor comprises a camera.

5. The system of claim 1 wherein the first sensor comprises a strain gauge.

6. The system of claim 1 wherein the first sensor comprises a weight sensor configured to measure the amount as a weight.

7. The system of claim 1 wherein the first sensor comprises a trigger configured to measure the amount as a count.

8. The system of claim 7 wherein the trigger is configured to measure the amount as a running count with addition for entry and subtraction for exit of marine life from the marine life trap.

9. The system of claim 1 further comprising a circuit electrically connected with the first and second sensors, the circuit configured to count the amount as catch entering and exiting the marine life trap.

10. The system of claim 1 further comprising a location antenna, wherein the transmitter is on a buoy and is configured to transmit a location from the location antenna.

11. The system of claim 1 wherein the transmitter is on to the marine life trap.

12. The system of claim 1 wherein the graphical user interface computer is configured to output location information.

13. The system of claim 1 wherein the graphical user interface computer is configured to output trends of performance of the marine life trap over time.

14. A method for generating catch information, the method comprising:
sensing quantities of sea life in traps;
transmitting the quantities output from the sensing to a buoy, boat, or shore;
receiving the quantities;
calculating a route to the traps for the boat as a function of locations of the traps and the quantities, the route including an order of the traps;
displaying the quantities and the routes in a graphical user interface.

15. The method of claim 14 wherein calculating comprises optimizing the route as a function of fuel costs to the locations, boat speed, and the quantities to maximize catch during retrieval and resetting operations.

16. The method of claim 14 wherein displaying comprises displaying the quantities and the locations, the quantities comprising counts or weights.

17. The method of claim 14 wherein displaying comprises displaying a location or abundance trend over a specified period of time as a function of species.

18. An automated system for generating catch information, the system comprising:
an underwater sea life trap;
at least one sensor and circuitry within the sea life trap configured to detect the presence of sea life in the sea life trap and further configured to generate signals including an identification label assigned to the sea life trap and signals describing a status of the sea life trap, the status including a quantity of sea life in the sea life trap;
a communication channel from the underwater sea life trap to a sea surface transceiver wherein the communication channel carries the signals including the identification label assigned to the sea life trap and the signals describing the status of the sea life trap; and
a land-based receiver configured to communicate with the sea surface transceiver wherein the land-based receiver receives the signals including the identification label assigned to the sea life trap and the signals describing the status of the sea life trap from the sea surface transceiver.

19. The automated system of claim 18 wherein the at least one sensor and circuitry comprises a entry sensor configured to detect entry of the sea life into the underwater sea life trap and an exit sensor configured to detect exit of the sea life from the underwater sea life trap.

20. The method of claim 14 further comprising recording the quantities at the traps prior to the transmitting.

21. The method of claim 14 wherein calculating comprises calculating onshore with the boat in dock.

22. A system for generating catch information, the system comprising:
a marine life trap having a marine life entrance and a marine life exit;
a first sensor on the marine life trap, the first sensor positioned to measure a first measure of the marine life entering through the marine life entrance of the marine life trap;
a second sensor, separate from the first sensor, on the marine life trap, the second sensor positioned to measure a second measure the marine life exiting through the marine life exit of the marine life trap;
a transmitter configured to communicate an amount to another device having a graphical user interface for representing the amount, the amount being a function of the first and second measures; and
a recording device on the marine life trap, the recording device configured to record the amount.

23. The method of claim 14 wherein sensing quantities of sea life in traps comprises sensing the quantities with a trap entry sensor offset by a trap exit sensor.

* * * * *